P. KRASSA.
PRESS FOR FILTERING FLUIDS.
APPLICATION FILED OCT. 14, 1911.

1,042,803.

Patented Oct. 29, 1912.

UNITED STATES PATENT OFFICE.

PAUL KRASSA, OF GÜSTROW, GERMANY, ASSIGNOR TO THE FIRM OF CHEMISCHE FABRIK GÜSTROW, OF GÜSTROW, GERMANY.

PRESS FOR FILTERING FLUIDS.

1,042,803.

Specification of Letters Patent.     Patented Oct. 29, 1912.

Application filed October 14, 1911. Serial No. 654,696.

*To all whom it may concern:*

Be it known that I, PAUL KRASSA, chemist, doctor of philosophy, a citizen of the Austro-Hungarian Empire, residing at Güstrow, Grand Dukedom of Mecklenburg, Germany, have invented certain new and useful Improvements in Presses for Filtering Fluids, of which the following is a specification.

In many industries, when it is necessary to filter slimy or colloidal fluids, the known apparatus for filtering—filter bags, presses, suction, and centrifugal apparatus, etc.—do not suffice to separate quickly sediments, etc., from the surrounding fluids. This is particularly the case with slimy or colloidal fluids because the matter which remains behind interferes with the action of the filtering material and forms an impermeable layer above it which destroys its efficiency. With fine grained sediments this disadvantage is less noticeable, because the deposit on the filter in most cases adds to the filtering effect of the latter. These disadvantages of the fluids difficult to treat have so far excluded the use of filter presses, so that only other filters such as filter bags have been available. These however occupy a disproportionate amount of space and time as compared with a satisfactory filter press, and hamper the whole conduct of business by the very long time requisite for filtering through a number of bags.

The object of the present invention is to render filter presses available for use with fluids difficult to filter, such as slimy and colloidal substances. This object is attained in the following manner, viz., the constituents of the fluid to be strained off are held in suspension between the filter surfaces of the press throughout the process. This is effected in the following manner: A stirring arm is arranged between the filter surfaces of the press and kept during the whole duration of the process, in continual agitation. The stirring arms or paddles are attached to a common shaft, as is the general practice in all churning (or stirring) apparatus. In order to avoid the difficult task of bedding and cleaning the shaft within the frame work of the filter and to facilitate the replacement and removal of the stirring arms, without pulling the whole filter to pieces, the single filters are so designed that they form a continuous channel through the filter chambers, out of which the shaft carrying the paddles can be inserted or drawn out in a single movement.

Figure 1:
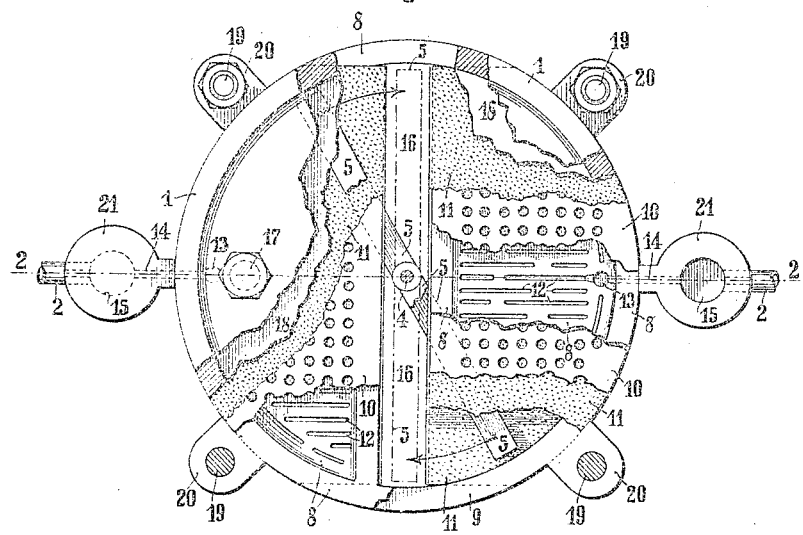
Figure 2:
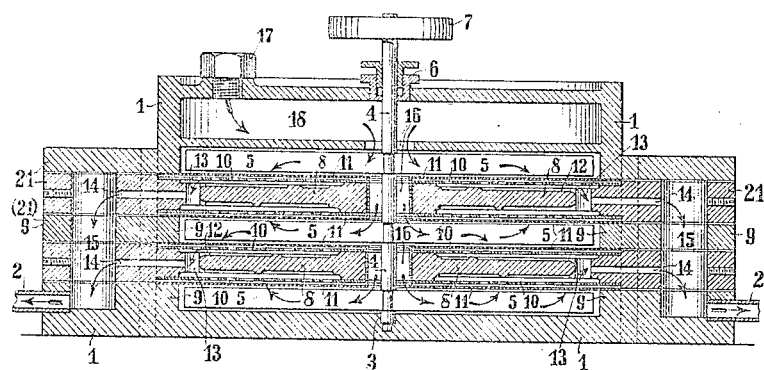

A construction according to this invention is shown in the accompanying drawing in which, Figure 1 is a plan showing various levels of the mechanism, and Fig. 2 is a longitudinal section on the line 2—2 in Fig. 1.

The filter press consists of the receptacle 1 which is closed in such a manner that the pressure can be reduced at the outlet pipes 2. In the bed plate 3 the shaft 4 with paddles 5 rests on a bearing, the shaft runs through a stuffing box 6 fixed in the cover and is provided with the driving wheel 7. The filter plates 8 and the filter frame 9 are disposed alternately one over the other and the filter plates are covered on both surfaces by sieve plates 10 which are wrapped in filter cloths 11. The filter plates are furnished with grooves 12. Between the filter plate 8 the stirring paddle 5 is placed, which rotates in the space inclosed by the frame 9, and thus keeps the sediment in continual agitation and suspension. Each filter plate 8 has openings 13 and channels 14 which meet in a common channel 15. The middle of the press is traversed by another channel 16 through which the shaft with its stirring paddles which are arranged one above the other can be inserted or withdrawn.

The operation of the filter press is as follows: The fluid to be filtered is poured into the opening 17, and flows through the space 18 and channel 16 when the paddles act upon it. It is driven through the filter cloths and sieve plates into the grooves 12, openings 13, channel 14, collecting channel 15 and is drawn off at 2.

The plates are held together by anchor bolts 19 through flanges 20. The common channel 15 lies in the flanges 21.

What I claim is:

A filter-press comprising a frame, movable filter elements therein, said filter elements each having a transverse opening, the openings arranged to register with each other, a shaft extending through said openings, stirrers mounted on said shaft and arranged to rotate between the surfaces of said filter elements, said stirrers being of smaller dimensions than said openings whereby the shaft and stirring devices can be withdrawn from the press through said openings, and means for rotating said shaft.

In testimony whereof I affix my signature in presence of two witnesses.

PAUL KRASSA.

Witnesses:
  WOLDEMAR HAUPT,
  HENRY HASPER.